United States Patent [19]

French

[11] Patent Number: 5,894,343

[45] Date of Patent: Apr. 13, 1999

[54] PASSIVE RANGEFINDER

[75] Inventor: Herbert Alan French, Hampshire, United Kingdom

[73] Assignee: The Secretary of State for Defence in Her Britannic Majesty's Government of the United Kingdom of Great Britain and Northern Ireland, London, United Kingdom

[21] Appl. No.: 07/195,990

[22] Filed: May 3, 1988

[30] Foreign Application Priority Data

May 5, 1987 [GB] United Kingdom .................. 8710567

[51] Int. Cl.[6] ............................... G01C 3/08; G01J 3/40
[52] U.S. Cl. ...................... 356/4.01; 356/300; 356/306; 701/225
[58] Field of Search ................... 356/4, 4.01, 300, 356/306; 364/458; 701/225

[56] References Cited

U.S. PATENT DOCUMENTS 3,103,586  9/1963  Ovrebo et al. .................. 356/4
3,117,228  1/1964  Jenness, Jr. et al. ............ 250/350

FOREIGN PATENT DOCUMENTS 2144847  of 1987  United Kingdom .

Primary Examiner—Stephen C. Buczinski
Attorney, Agent, or Firm—Nixon & Vanderhye PC

[57] ABSTRACT

A passive rangefinder for determining the range to an object such as an aircraft, rocket or missile which emits electromagnetic radiation makes use of spectral measurements over a broad band of frequencies. The rangefinder includes means 202 for forming a real image of a field of view, spectrophotometer means 201 including an entrance aperture 27 placed to receive at least a part of said real image, dispersion means (15, 28, 29) for separating radiation of different wavelengths and detector means 24 for measuring the spectrum of radiation received from distinct portions of the entrance aperture. The detector output is connected to data processing means 204 arranged to deconvolve the received spectral profile with a stored representation (205) of a range-dependent atmospheric transmission spectral profile to obtain a representation of the spectral emission profile of radiation from the object. From the emission spectral profile a characteristic temperature of emission (206) is derived and hence a Planck emission spectrum for the object. The Planck spectrum is used to determine the range from the calculated emission spectrum and the observed spectrum (205, 208). Thus by deconvolving the measured spectrum with the atmospheric transmission spectrum the range can be determined. The invention can work at any range of e.m. radiation for which suitable components are available. Advantageously the ranging is done on two different temperature portions of the same object so that different Planck profiles are used in the signal processing. The atmospheric transmission spectrum can be measured prior to operation in the prevailing conditions by use of a laser rangefinder.

8 Claims, 5 Drawing Sheets

PASSIVE RANGEFINDER

This invention relates to passive identification and rangefinder apparatus for identifying the range to a distant object emitting infra red radiation, such as a jet, rocket or missile, from infra-red spectrophotometer measurements.

For the identification and rangefinding of missiles and aircraft in warfare, a passive equipment which operates by responding to radiation inherently associated with the flight of the missile or aircraft has obvious advantages.

The possibility of determining the range to an aircraft by measurements of its infrared radiation has been disclosed by Ovrebo et al in U.S. Pat. No. 3,103,586 and by Jenness et al in U.S. Pat. No. 3,117,228. These specifications disclose arrangements in which the total infra-red radiation received from an aircraft is compared with the proportion of the received radiation which passes a filter which cuts out radiation within the absorption bands of atmospheric carbon dioxide and nitrogen oxide. If the aircraft is at a comparatively short range, of the order of 1 kilometre or less, there will be a significant difference in these measurements because some proportion of radiation emitted by the aircraft within the absorption band will reach the observation point in spite of atmospheric absorption. Assuming that the radiation initially emitted had the spectral distribution of a Planck radiation curve for a black body at some specific temperature, these specifications disclose methods and apparatus for deducing a range measurement from the difference between the measurements. At longer ranges however, the atmospheric absorption becomes very similar to the absorption produced by the filter; the difference between the measurements becomes comparatively small and insensitive to further increases in range.

UK Patent Application No. 8310933 (U.S. Ser. No. 633,260 filed Apr. 10, 1984) discloses a passive rangefinder capable of ranging at distances above 1 km. A sliced spectrum technique is used whereby changes near atmospheric absorption features in the transmitted spectrum are measured. The amount of radiation received from such regions of the spectrum is sensitive to range and can be fairly readily measured. Such a method, however, does not make use of all of the spectrum emitted by the target. It depends upon a spectral profile of unknown shape due to source temperature and line broadening by pressure, collision and temperature. UK Patent Application No. 8321752 (now UK Patent 2,144,847) discloses an optical spectrum analyser which enables a complete spectrum to be measured very rapidly and thus provides a suitable means for making real time measurements of the optical spectrum.

The object of the present invention is to provide a passive rangefinder effective at long range and utilising the broad electromagnetic spectral emission from a target.

The invention provides a passive rangefinder for determining the range to an object such as an aircraft, rocket or missile which emits electromagnetic radiation including:
   means for forming a real image of a field of view;
   spectrophotometer means which includes an entrance aperture placed to receive at least a part of said real image, dispersion means for separating radiation of different wavelengths and detector means for measuring the spectrum of radiation received from distinct portions of the said entrance aperture
   and data processing means for receiving radiation measurement signals from the detector means;
the data processing means being arranged to deconvolve the received spectral profile with a stored representation of a range-dependent atmospheric transmission spectral profile to obtain a representation of the spectral emission profile of radiation from the object, to derive therefrom a characteristic temperature of emission and hence a Planck emission spectrum for the object and thence to determine the range from the calculated emission spectrum and the observed spectrum.

Once an estimated source temperature has been determined the exact shape of the emission spectrum is then determined from Planck's Law and then knowing the way in which the spectrum is modified by atmospheric transmission it should be possible to calculate the received spectrum.

The present invention unlike the prior art arrangements described above makes additional use of spectral information in the non absorptive regions of the atmospheric transmission. These measurements are least affected by atmospheric absorption and hence are most reliable in determining the source temperature and are therefore important in the present invention. The invention is particularly useful in the infra-red spectral region but may also be applied wherever suitable components are available, for example: visible light, ultra-violet, microwave and radiant.

Advantageously the data processing means includes an iterative processor whereby the temperature of the object and the range are optimised. Thus the atmospheric transmission and the Planck radiation curve from the object are changed until the measured spectrum is reconstructed.

Preferably the data processing means adjusts an assigned value for the emissivity of object to improve the fit of the calculated spectrum at the rangefinder to the measured spectrum.

In a particular advantageous arrangement the received spectrum is rapidly scanned by means of a rapid spectrum analyser described in UK Patent Application No. 8321752. In spectral regions where there is almost total atmospheric absorption data may be discounted from the processor calculations. On the other hand, where there is little absorption greater weight may be given to the measurements as these will closely indicate the correct Planck radiation curve. Difficult spectral regions, for example where there is near total atmospheric absorption, are preferably ignored and conventional statistical methods are used to provide the best fit to the measured results. Range determination can be improved by measurements made on different temperature areas of the target, thereby making use of different Planck profiles. Furthermore, the atmospheric absorption profile can be calibrated against objects of known distance prior to use. An active range finder, for example, could be used for the initial calibration in the prevailing conditions.

The invention will now be described by way of example only with reference to the accompanying Drawings of which:

Figure 1:
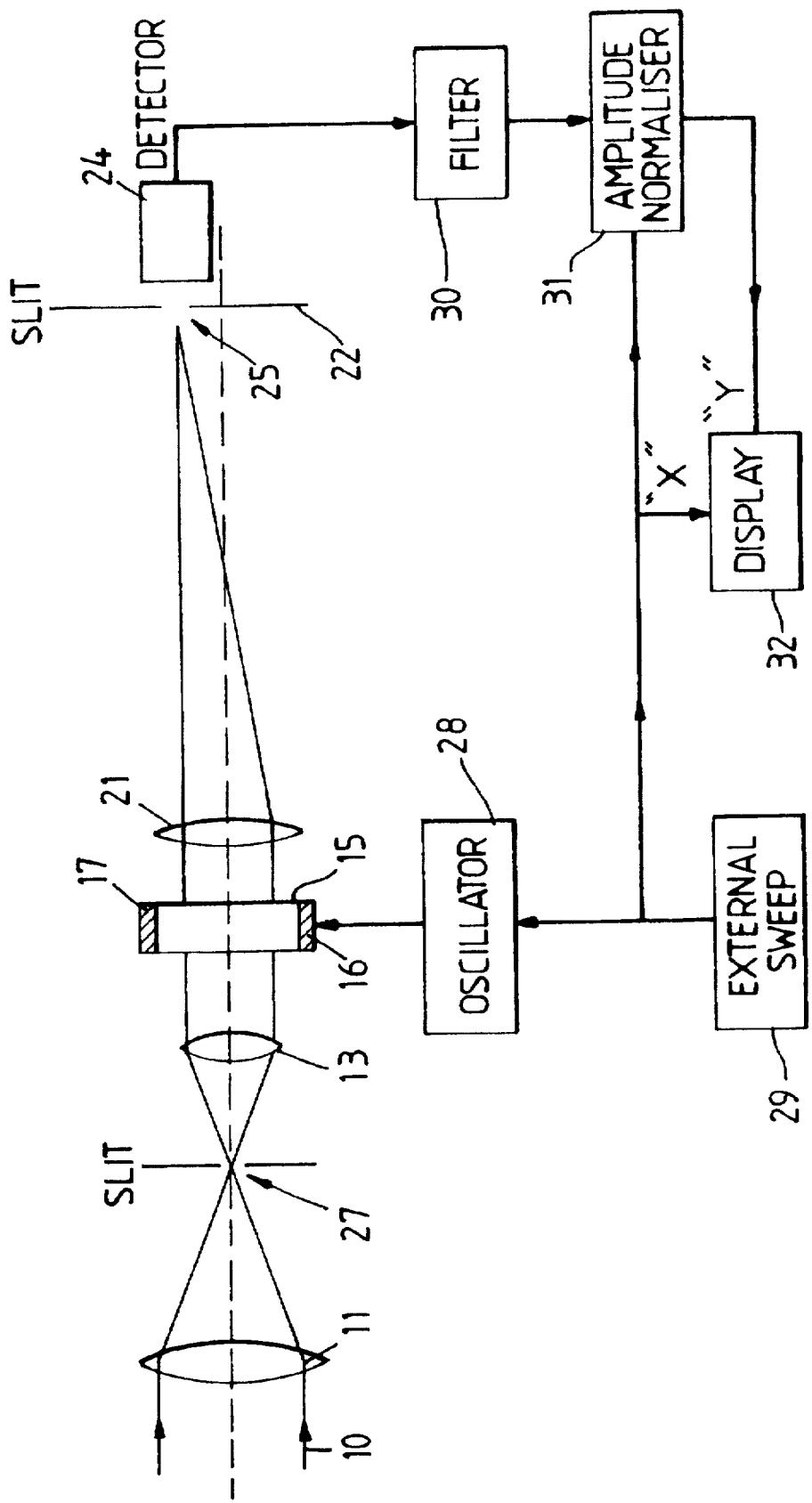
FIG. 1 is a known fast spectrum analyser.

FIG. 1 shows a spectrum analyser as described in UK patent application No. 8321752. Parallel light 10, exemplifying electromagnetic radiation, from a field of view is incident on a first lens 11 which focuses the light at the focus of a second lens 13. Parallel light from lens 13 passes through an acousto-optic (A-O) cell 15 and is then focussed by a third lens 21 to a Fourier plane 22 provided with an off-axis slit 25. Light passing through the slit 25 is detected by detector 24. A field stop 27 is provided at the focus of the lens 13.

The A-O cell 15 has an input piezoelectric transducer 16 driven by an oscillator 28 whose frequency is swept by a sweep 29. The A-O cell 15 produces a phase delay in the path of the light dependent on the refractive index of the transparent medium contained within the cell. There are variations of phase delay produced along the length of the A-O cell caused by stress variations in the acoustic waves whose frequency is time-dependent, driven by the swept frequency applied to the transducer 16. A matched acoustic load 17 prevents acoustic wave reflections. The arrangement is such that light emerging from the A-O cell 15 is Fourier transformed by the lens 21 such that a series of diffraction orders appears in the Fourier plane 22. The energy distribution in plane 22 is therefore the spectrum of the input electromagnetic energy 10.

If a monochromatic plane wave, as from a distant laser source, is incident on the A-O cell 15 and a sinusoidal signal is applied to the cell 15 then the signal emerging from the A-O cell is the product of the incident plane wave signal and the applied sinusoid. This product signal is then Fourier Transformed to give the incident signal spectrum in the Fourier Plane 22. In the Fourier Plane there will be one positive and one negative diffraction order in addition to the zero order and the distance from the origin of the positive order (say) is a function of the wavelength of the laser source. If the spectrum of the source is broadened then the diffraction first orders, corresponding to each quasi-monochromatic element of the source spectrum, will overlap. By sweeping the frequency of the applied sinusoid, the spectrum of a polychromatic incident signal can be sifted and displayed from the output of a detector in the Fourier Plane 22.

Figure 2:
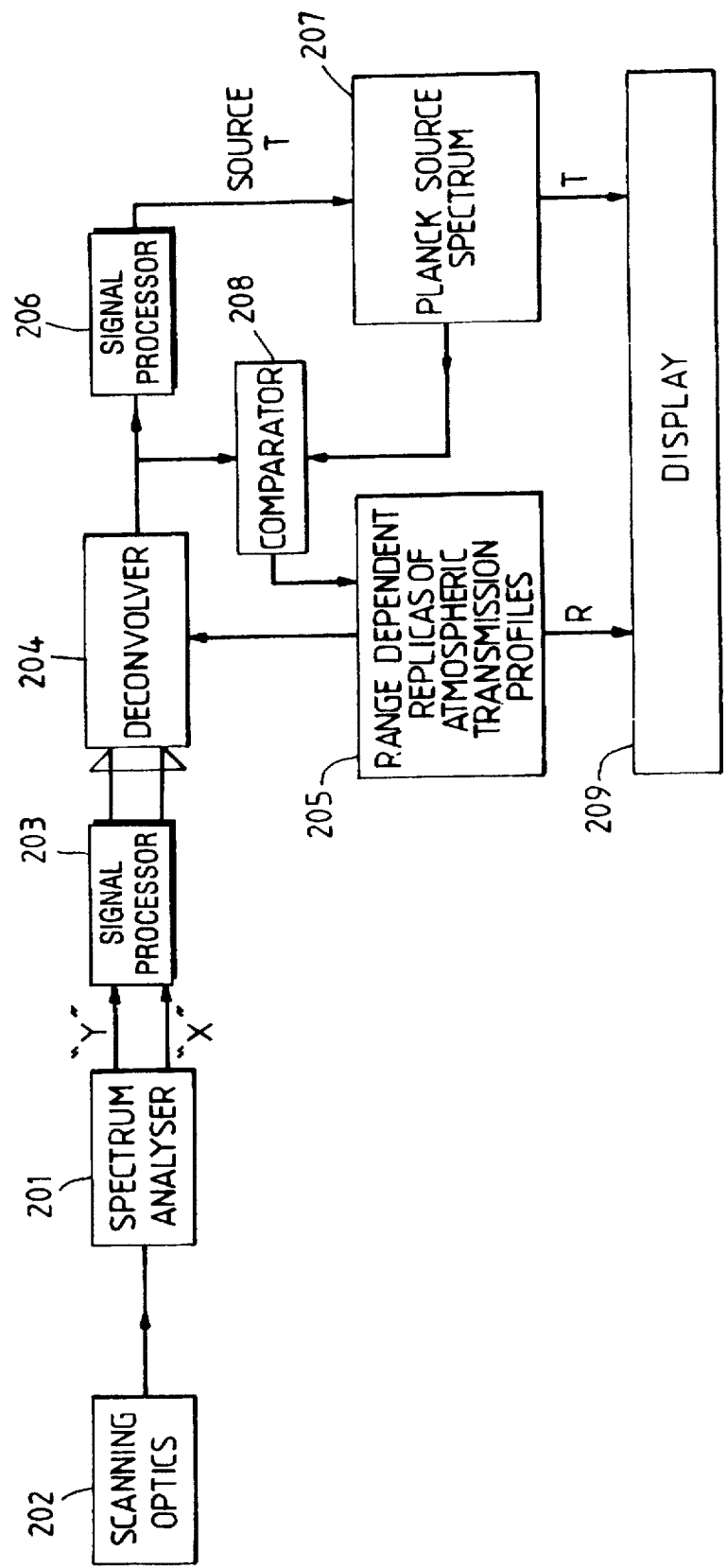
FIG. 2 shows a block diagram of the spectrum analyser of FIG. 1 incorporated in a passive rangefinder according to the present invention.

The optical spectrum analyser described above can scan the optical frequency range very rapidly making it possible to measure real time changes in broad-band source spectra. This arrangement is suitable for use in the passive rangefinder of the present invention. A block diagram of the invention is shown in FIG. 2. A spectrum analyser 201 as shown in FIG. 1 produces X and Y signals respectively corresponding to the external sweep frequency applied to the acousto-optic cell 15 and the measured variation of detected signal amplitude. A scanning arrangement is provided at the input to the spectrum analyser 201 to vary the field of view. The X and Y signals are processed in the processor 203 to produce the optical spectrum of the analysed light. This detected spectrum is equivalent to the optical spectrum of a light source in the field of view modulated by the range and wavelength dependent atmospheric absorption function. The received spectrum output from the processor 203 is connected to one input of a deconvolver. An atmospheric transmission function corresponding to a particular selected range R is connected from a transmission function store 205 to a second input 204 of the deconvolver 204. The deconvolver 204 produces an output spectrum corresponding to the source emission spectrum prior to transmission over the atmospheric range R. This output spectrum from the deconvolver 204 is connected to a second processing circuit 206 which derives a characteristic source temperature from the spectrum. This characteristic temperature is then processed in a circuit 207 to give a Planck emission spectrum corresponding to the temperature. The Planck source spectrum and the deconvolved received spectrum are then compared by a comparator 208. The comparator 208 produces an output signal corresponding to differences between the compared spectra; the output signal being connected to the atmospheric transfer function store 205 such that another atmospheric transfer function, corresponding to an improved range/source temperature/emissivity estimate, is connected to the deconvolver 204. By an iterative process the passive rangefinder produces a measurement of range and source temperature, useful for both ranging and identification of targets.

Once a target of interest has been identified the optical scanning may be over-ridden. With suitably large targets, after ranging on one portion of the target with a characteristic temperature $T_1$, ranging may be carried out on a second target portion with a different characteristic temperature $T_2$. These two portions will have different Planck emission spectra but the same range and thus a second iterative ranging process can be carried out on the same target. Signals representing the measured range and characteristic temperature of the target are connected to a display 209.

Figure 3:
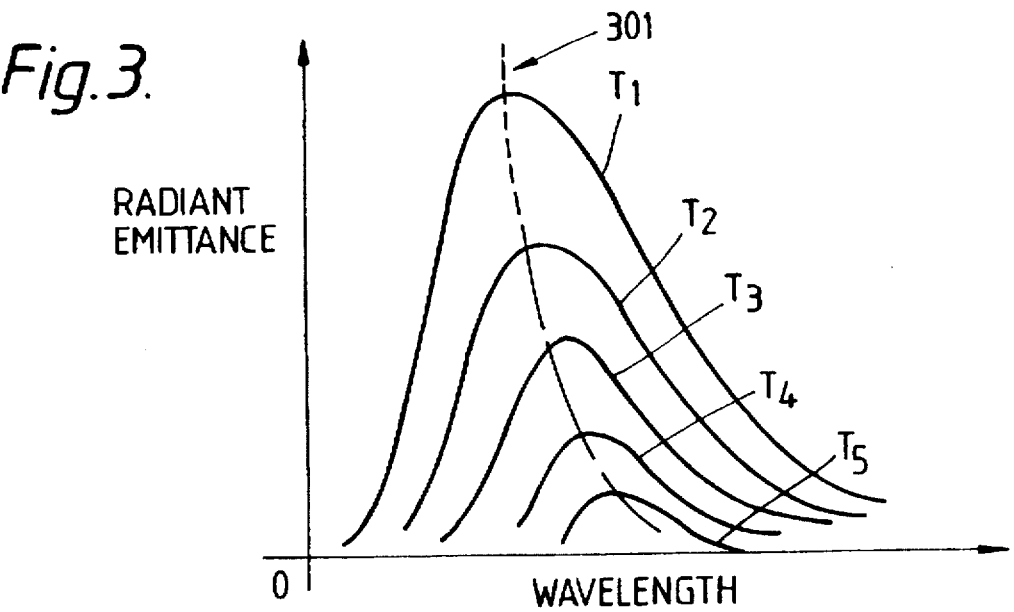
FIG. 3 shows graphs of the wavelength dependent of radiant emittance for different characteristic source temperatures.
Figure 4:
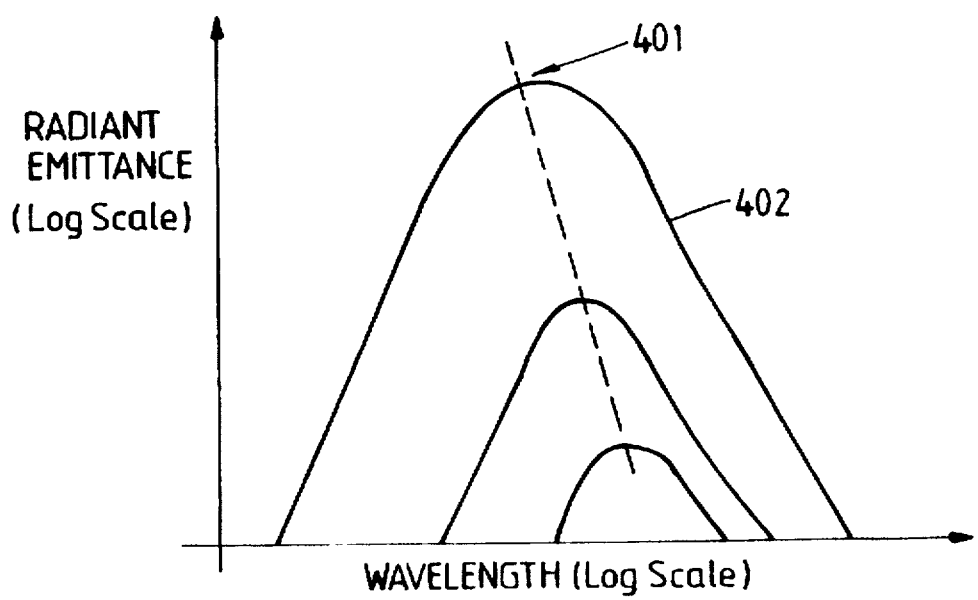
FIG. 4 shows the FIG. 3 curves on a log—log scale.

The operation of the passive rangefinder will now be described in more detail. FIG. 3 shows the Planck radiation curves of radiant emittance (W cm-2 μ-1) against wavelength in microns for sources at different temperatures $T_1$ to $T_4$. Each curve has a peak at a different wavelength defined by Wien's Displacement Law. On the linear scales as shown in FIG. 3 Wien's Displacement Law defines the curve 301. When the Planck curves are drawn on a log—log scale as shown in FIG. 4 the curves are now all the same shape and the Wien Displacement Law is now a straight line 401. The passive rangefinder processor 207 uses the log—log relationship where a template of the curve 402 is made to slide along the linear Wien Law 401 to generate any of the required profiles. The position of each temperature curve can be found by calculating the peak for any absolute temperature by using the Wien relationship $$\lambda max\ T = 2897.9\ \mu°k.$$

Figure 5:
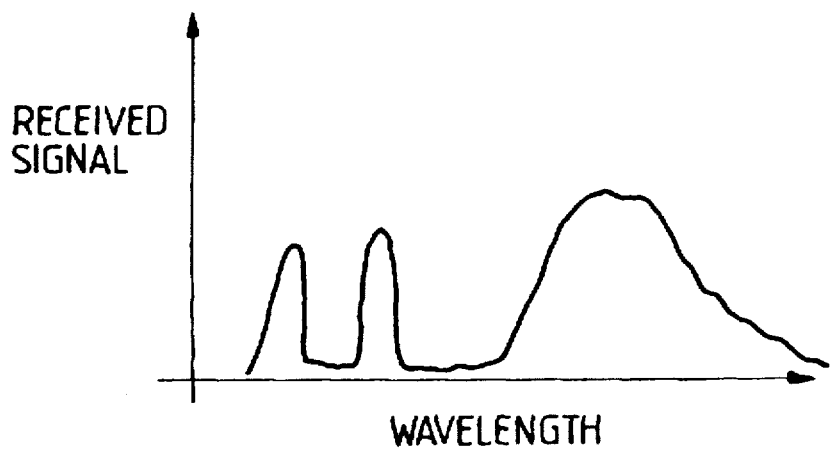
FIG. 5 shows a typical received signal spectrum.
Figure 6:
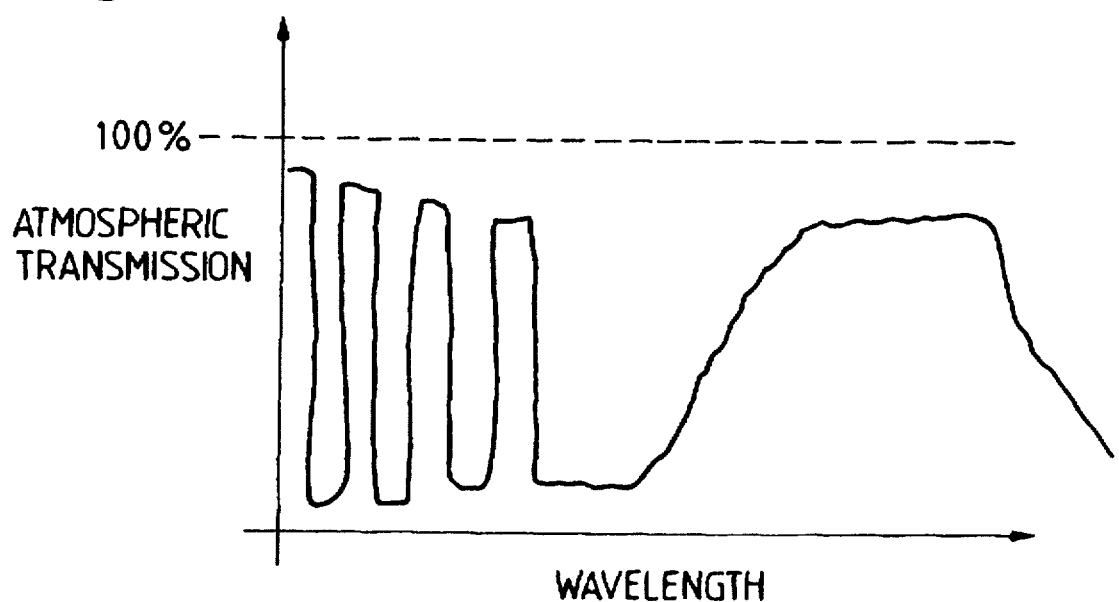
FIG. 6 shows a typical graph of the wavelength dependents of atmospheric transmission.
Figure 7:
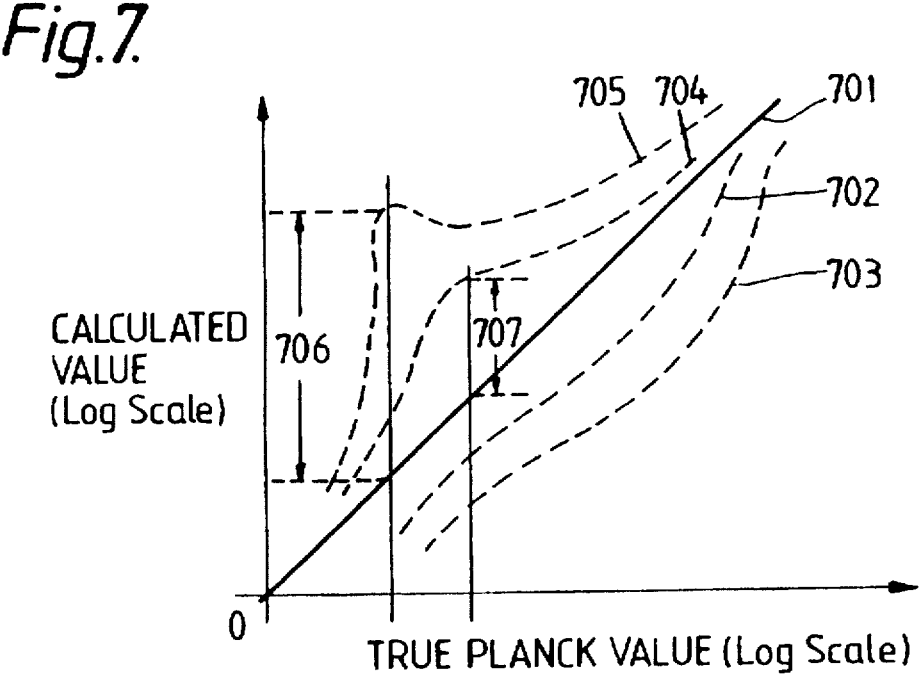
FIG. 7 shows graphs illustrating the operation of the comparator circuit in the FIG. 2 arrangement.

After transmission through a depth R (range) of the atmosphere the spectral profile of emitted radiation from a source undergoes modification by the selective transmission properties of the atmosphere. A typical received signal, as shown in FIG. 5, is the result of convolving the Planck emission spectrum with the atmospheric transmission function, as exemplified in FIG. 6. If the true atmospheric transmision function is known then by deconvolving the received spectrum with the atmospheric transmission function one of the temperature profiles of FIG. 4 is produced. If the atmospheric spectral profile (FIG. 6) produced by the store 205 and the source temperature T obtained from the processor are exact then the deconvolved received spectrum output from the deconvolver 204 plotted against the Planck source spectrum output from unit 207 would result in a straight line 701 as shown in FIG. 7. In this case the comparator 208 would cause the range R and T to be displayed. If the source temperature T were too low, resulting in the selection of a wrong Planck curve from FIG. 4 then the resulting comparator curve would be to one side of the line 701, for example one of the two lines 702 or 703 depending upon the temperature error. If the estimated temperature T were too high then the resulting curve would be above the line 701 (e.g. 704, 705) and there would be a peak deviation from the straight line, e.g. 706 or 707, which would indicate where the true temperature peak (of FIG. 4)

lies. Thus the deviations from the straight line 701 indicate the magnitude and direction of the temperature error and by an iterative process the shape (one of 702–705 say) can be made to "relax" to the true line 701.

Figure 8:
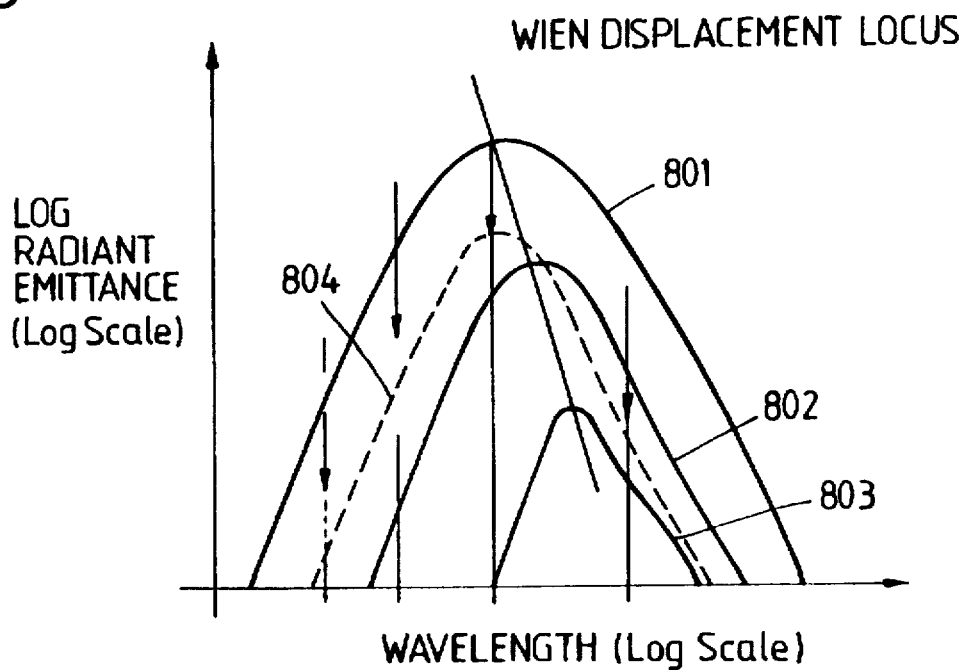
FIG. 8 shows the effect of source emissivity on the radiant emittance curves of FIG. 4.

The source emissivity, another unknown, lies between 0 and 1. Whereas temperature (T) changes cause wavelength displacements of the emittance curves (FIG. 4) emissivity changes only shift the characteristic emittance curves up or down. This is illustrated in FIG. 8. Radiation emittance curves 801–803 are shown for different source temperatures $T_1$–$T_3$, assuming emissivity =1. For the same source temperature $T_1$, by making the emissivity <1 the curve 801 now becomes 804. This would result in a quite different and distinctive deviation in the comparator 208 from the straight line 701. Thus the "bump" would appear at quite a different place and would indicate that the emissivity value should be adjusted so as to allow the measured comparator curve to "relax" to the straight line 701. Thus an incorrect source temperature can be distinguished from a correction which should be applied to target emissivity. Thus the rangefinder can also be arranged to display the target emissivity in addition to range and temperature.

If the atmospheric transmission profile from the unit 205 is in error in a particular spectral region, as for example by under- or over-estimating the absorption by one of the atmospheric constituents, then the deviation from the line 701 would again be recognisable as occuring at a wavelength of known gas absorption and this could be discriminated against so as to leave adjacent regions of the comparator curve unaffected.

In practice a microprocessor would have the necessary stored data to allow the iterative processing of the received optical spectrum to derive the required source parameters.

The prior art arrangement described in UK patent application No. 8310933 does not use spectral information gained from the non-absorption regions of atmospheric transmission or from regions which have different absorption effects from the constituents currently being used (i.e. oxides of carbon and nitrogen). Points on the comparator curve (702–705) where little or no absorption occurs do, however, indicate where the correct source parameters are and thus assist the iterative process for correcting the under- or over-estimated points.

Difficult areas of the spectrum can be eliminated by removing data from those regions and conventional statistical methods can be adopted to give "best fits".

By making observations on several different temperature regions on a target, more accurate results can be produced since the recorded spectrum will be successively deconvolved by different Planck curves.

Although the invention has been described in relation to the optical spectrum analyser of UK Patent Application No. 8321752 other spectrum analysers could be used. The apparatus described, however, has the advantage of rapid spectral observation, enabling measurements to be taken on moving targets.

If the target is a true Planck radiator, then the emission spectrum is continuous and follows Planck's Law. However if it is chemical, there will be characteristic spectral lines. The peaks of these lines, however, will lie on the Planck curve and so the technique described herein will still work.

I claim:

1. A passive rangefinder for determining the range to an object such as an aircraft, rocket or missile which emits electromagnetic radiation including:

means for forming a real image of a field of view;

spectrum analyzer means comprising:
   an entrance aperture placed to receive at least a part of said real image;
   dispersion means for separating radiation of different wavelengths; and
   detector means for measuring the spectrum of radiation received from distinct portions of the said entrance aperture;

memory means for storing representations of range-dependent atmospheric transmission spectral profiles corresponding to a plurality of ranges;

deconvolver means for providing at an output a representation of the spectral emission profile of the source of electromagnetic radiation, said deconvolver means having first and second inputs;

means for conveying radiation measurement signals from the spectrum analyzer to said first input and for conveying a selected atmospheric transmission spectral profile corresponding to a range R from said memory means to said second input;

calculator means, connected to the output from the deconvolver means, for calculating a characteristic temperature T of said object from the representation of the source spectral emission profile and for deriving from said emission profile a Planck emission spectrum; and comparator means having a first input connected to the output from the deconvolver means and a second input connected to the output from the calculator means, for comparing said Planck spectrum at temperature T with a calculated representation of the source emission profile and, if a comparison difference is within predetermined limits, for providing, at an output, values of R and T.

2. A passive rangefinder as claimed in claim 1, wherein the output of the comparator means is connected to said memory means and is arranged such that when the first and second inputs to the comparator means do not correspond within the said predetermined limits, said comparator means further comprises means for transmitting a signal to the memory means causing a different selected atmospheric transmission spectral profile, corresponding to a range R', to be transmitted from the memory means to the second input of the deconvolver means optimizing the range and temperature of the object by iteration.

3. A passive rangefinder as claimed in one of claims 1 or 2 wherein the comparator means includes means for distinguishing an incorrect value of source emissivity and for assigning a corrected value between 0 and 1 to improve the fit of the two input source spectra.

4. A method for passive determination of the range to an object such as an aircraft, rocket or missile which emits electromagnetic radiation comprising the steps of:

forming a real image of a field of view;

spectrally analyzing the received radiation at least at a part of said real image;

deconvolving the measured radiation measurement signals with an atmospheric transmission spectral profile corresponding to a range R selected from a family of such profiles for different ranges to provide, at an output, a representation of the spectral emission profile of the source;

calculating a characteristic temperature T of the object from the representation of the source spectral emission profile and deriving therefrom a Planck emission spectrum;

comparing the Planck emission spectrum at temperature T with the calculated representation of the object emission profile; and providing, at outlets of the rangefinder, values of R and T if the differences between the Planck emission spectrum and the calculated representation of the object emission profile are within predetermined limits.

5. A method for passive determination of the range to an object as claimed in claim 4, wherein there is included the additional step of discounting received spectral data in spectral regions where there is substantially total atmospheric absorption.

6. A method for passive determination of the range to an object as claimed in one of claims 4 or 5, wherein greater weight is given to spectral measurements in wavelength regions where there is little absorption as these will closely indicate the correct Planck radiation curve.

7. A method for passive determination of the range to an object as claimed in one of claims 4 or 5 wherein said spectrally analyzing step includes analyzing radiation from at least two areas of a target at differing temperatures, thereby making use of different Planck profiles.

8. A method for passive determination of the range to an object as claimed in one of claims 4 or 5 wherein said deconvolving step includes the step of calibrating the atmospheric absorption profile against objects of known distance prior to use.

* * * * *